United States Patent
Wang et al.

(10) Patent No.: US 11,963,181 B2
(45) Date of Patent: Apr. 16, 2024

(54) BASE-STATION-INITIATED GRANT REVOKE

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 519 days.

(21) Appl. No.: 17/294,292

(22) PCT Filed: Nov. 26, 2019

(86) PCT No.: PCT/US2019/063221
§ 371 (c)(1),
(2) Date: May 14, 2021

(87) PCT Pub. No.: WO2020/117557
PCT Pub. Date: Jun. 11, 2020

(65) Prior Publication Data
US 2022/0030618 A1    Jan. 27, 2022

Related U.S. Application Data

(60) Provisional application No. 62/776,371, filed on Dec. 6, 2018.

(51) Int. Cl.
*H04W 72/23*    (2023.01)
*H04L 1/00*    (2006.01)
(Continued)

(52) U.S. Cl.
CPC ........... *H04W 72/23* (2023.01); *H04L 1/0003* (2013.01); *H04L 1/1812* (2013.01); *H04W 72/1263* (2013.01); *H04W 72/569* (2023.01)

(58) Field of Classification Search
CPC ......... H04W 36/0007; H04W 36/0069; H04W 36/36; H04W 36/362; H04W 72/0453;
(Continued)

(56) References Cited

U.S. PATENT DOCUMENTS

| 6,069,883 A * | 5/2000 | Ejzak | H04W 28/22 |
| | | | 370/335 |
| 6,366,945 B1 * | 4/2002 | Fong | G06F 9/5066 |
| | | | 718/104 |

(Continued)

FOREIGN PATENT DOCUMENTS

| WO | 2009115909 | 9/2009 |
| WO | 2009134196 | 11/2009 |

(Continued)

OTHER PUBLICATIONS

"International Preliminary Report on Patentability", Application No. PCT/US2019/063221, dated Jun. 8, 2021, 8 pages.

(Continued)

*Primary Examiner* — Joseph Arevalo
(74) *Attorney, Agent, or Firm* — Colby Nipper PLLC

(57) ABSTRACT

This document describes techniques and systems that enable a base-station-initiated grant revoke. The techniques and systems allow a base station to generate and send a grant-revocation message (GRM) to a user equipment (UE) to revoke a scheduled uplink (UL) or downlink (DL) grant from the base station. The base station can transmit the GRM to the UE using a variety of techniques. For example, based on a trigger event, the base station may assign a UE identifier, such as a specific radio network temporary identifier (RNTI), to the UE and transmit the GRM to the UE using a revoke-physical-downlink-control-channel (R-PDCCH) transmission that is associated with the UE identifier. These techniques allow the base station to revoke a scheduled UL or DL grant, which can enable the UE to quickly address timing-critical resource allocation issues and mitigate the effects of adverse operating conditions.

20 Claims, 4 Drawing Sheets

(51) Int. Cl.
  *H04L 1/1812* (2023.01)
  *H04W 72/1263* (2023.01)
  *H04W 72/566* (2023.01)

(58) Field of Classification Search
  CPC ............. H04W 72/1263; H04W 72/23; H04W 72/569; H04W 74/008; H04W 74/0833; H04W 76/38
  USPC .... 455/450, 422.1, 436, 442, 522, 406, 411, 455/444, 458
  See application file for complete search history.

(56) References Cited

U.S. PATENT DOCUMENTS

| | | | |
|---|---|---|---|
| 9,363,797 B2 | 6/2016 | Freda et al. | |
| 2006/0120321 A1* | 6/2006 | Gerkis | H04W 28/22 370/437 |
| 2007/0013948 A1* | 1/2007 | Bevan | G06F 3/1288 358/1.15 |
| 2009/0047968 A1* | 2/2009 | Gunnarsson | H04W 48/12 455/446 |
| 2011/0292890 A1* | 12/2011 | Kulkarni | H04W 72/27 455/450 |
| 2012/0082050 A1* | 4/2012 | Lysejko | H04W 72/541 370/252 |
| 2012/0155354 A1* | 6/2012 | Kishigami | H04L 1/1692 370/329 |
| 2013/0016639 A1* | 1/2013 | Xu | H04W 24/08 370/329 |
| 2013/0182668 A1* | 7/2013 | Xu | H04W 74/0833 370/329 |
| 2016/0249333 A1 | 8/2016 | Freda et al. | |
| 2017/0332215 A1 | 11/2017 | Lin | |
| 2018/0049197 A1* | 2/2018 | Patel | H04L 43/0847 |
| 2018/0132111 A1* | 5/2018 | Mueck | H04B 1/7136 |
| 2018/0199359 A1* | 7/2018 | Cao | H04L 1/1896 |
| 2018/0279262 A1 | 9/2018 | Babaei et al. | |
| 2019/0029009 A1 | 1/2019 | Freda et al. | |
| 2019/0104541 A1 | 4/2019 | Lee et al. | |
| 2020/0351897 A1* | 11/2020 | Fakoorian | H04W 72/0453 |
| 2021/0217063 A1* | 7/2021 | Lee | G06F 40/186 |

FOREIGN PATENT DOCUMENTS

| | | |
|---|---|---|
| WO | 2016086981 | 6/2016 |
| WO | 2020117557 | 6/2020 |

OTHER PUBLICATIONS

"Control of Semi Persistent Scheduling", TSG-RAN WG2 Meeting #61, Sorrento, Italy, Feb. 11-15, 2008, 2 pages.

"International Search Report and Written Opinion", PCT Application No. PCT/US2019/063221, dated Feb. 21, 2020, 15 pages.

* cited by examiner

BASE-STATION-INITIATED GRANT REVOKE

RELATED APPLICATION(S)

This application is a national stage entry of International Application No. PCT/US2019/063221, filed Nov. 26, 2019, which claims the benefit of U.S. Provisional Application No. 62/776,371, filed Dec. 6, 2018, the disclosures which are incorporated herein by reference in their entirety.

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular networking, fixed wireless broadband, and the Internet of Things (IoT).

A unified air interface, which utilizes licensed, unlicensed, and shared license radio spectrum in multiple frequency bands, is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband. Another aspect of enabling the capabilities of 5G systems is the use of Multiple Input Multiple Output (MIMO) antenna systems to beamform signals transmitted between base stations and user equipment to increase the capacity of 5G radio networks.

Portions of a 5G network may be implemented as a high-density network in which some base stations or cells may serve fewer traditional mobile users than in conventional, pre-5G networks. As noted, however, 5G networks enable higher data rates and greater capacity, along with improved reliability and lower latency, which allows these networks to serve a higher number of total user equipment, including internet-of-things (IoT)-connected devices, autonomous vehicles and drones, and so-called mission-critical devices, which may have stricter requirements with respect to timing or other factors. As a result of this diversity of user equipment, 5G base stations are expected to support a wide variety of users and services at one time, with different requirements for reliability, latency, and priority timing.

SUMMARY

This document describes techniques and systems that enable a base-station-initiated grant revoke. The techniques and systems allow a base station to generate and send a grant-revocation message (GRM) to a user equipment (UE) to revoke a scheduled uplink (UL) or downlink (DL) grant from the base station. The base station can transmit the GRM to the user equipment using a variety of techniques. For example, the base station may assign a UE identifier, such as a specific radio network temporary identifier (RNTI), to the user equipment and transmit the GRM to the user equipment using a revoke-physical-downlink-control-channel (R-PDCCH) transmission that is associated with the UE identifier. In some cases, the base station can detect one or more trigger events that can indicate that the grant should be revoked. These techniques allow the base station to revoke a scheduled UL or DL grant, which can enable the user equipment to quickly address timing-critical resource allocation issues and mitigate the effects of adverse operating conditions such as excessive radio-frequency (RF) interference, low back-up battery capacity, or excessive temperature at the base station.

In some aspects, a method for revoking a grant to a user equipment (UE) is described. The method comprises assigning, by a base station, a UE identifier to the UE. The method also comprises detecting a trigger event and, in response to the trigger event, generating a grant-revocation message (GRM) that is associated with the UE identifier and which specifies a grant to be revoked. The method further includes canceling the grant specified in the GRM and transmitting the GRM to the UE using a revoke-physical-downlink-control-channel (R-PDCCH) transmission that is associated with the UE identifier. The transmitting effective to terminate a scheduled network transmission between the base station and the UE defined by the GRM.

In further aspects, a base station is described that includes a radio-frequency (RF) transceiver and a processor and memory system to implement a resource manager application. The resource manager application is configured to assign a user equipment (UE) identifier to a UE and to detect a trigger event. In response to the trigger event, the resource manager is configured to generate a grant-revocation message (GRM) that is associated with the UE identifier and which specifies a grant to be revoked. Further, the resource manager application retracts the grant specified in the GRM and uses the RF transceiver to transmit the GRM to the UE. The transmitted GRM is effective to terminate a scheduled network transmission defined by the GRM between the base station and the UE.

In further aspects, a base station is described that includes a radio-frequency (RF) transceiver and a processor and memory system to implement a first means that can be used to assign a user equipment (UE)-identifier to a UE and to detect a trigger event. In response to the trigger event, the first means is configured to generate a second means that that is associated with the UE identifier and which specifies a grant to be revoked. Further, the first means can retract the grant specified by the second means and transmit the second means to the UE. The transmitted second means terminates a scheduled network transmission between the base station and the UE defined by the second means.

This summary is provided to introduce simplified concepts of the base-station-initiated grant revoke. The simplified concepts are further described below in the Detailed Description. This summary is not intended to identify essential features of the claimed subject matter, nor is it intended for use in determining the scope of the claimed subject matter.

BRIEF DESCRIPTION OF THE DRAWINGS

Aspects of a base-station-initiated grant revoke are described with reference to the following drawings. The same numbers are used throughout the drawings to reference like features and components.

DETAILED DESCRIPTION

Overview

Figure 1:
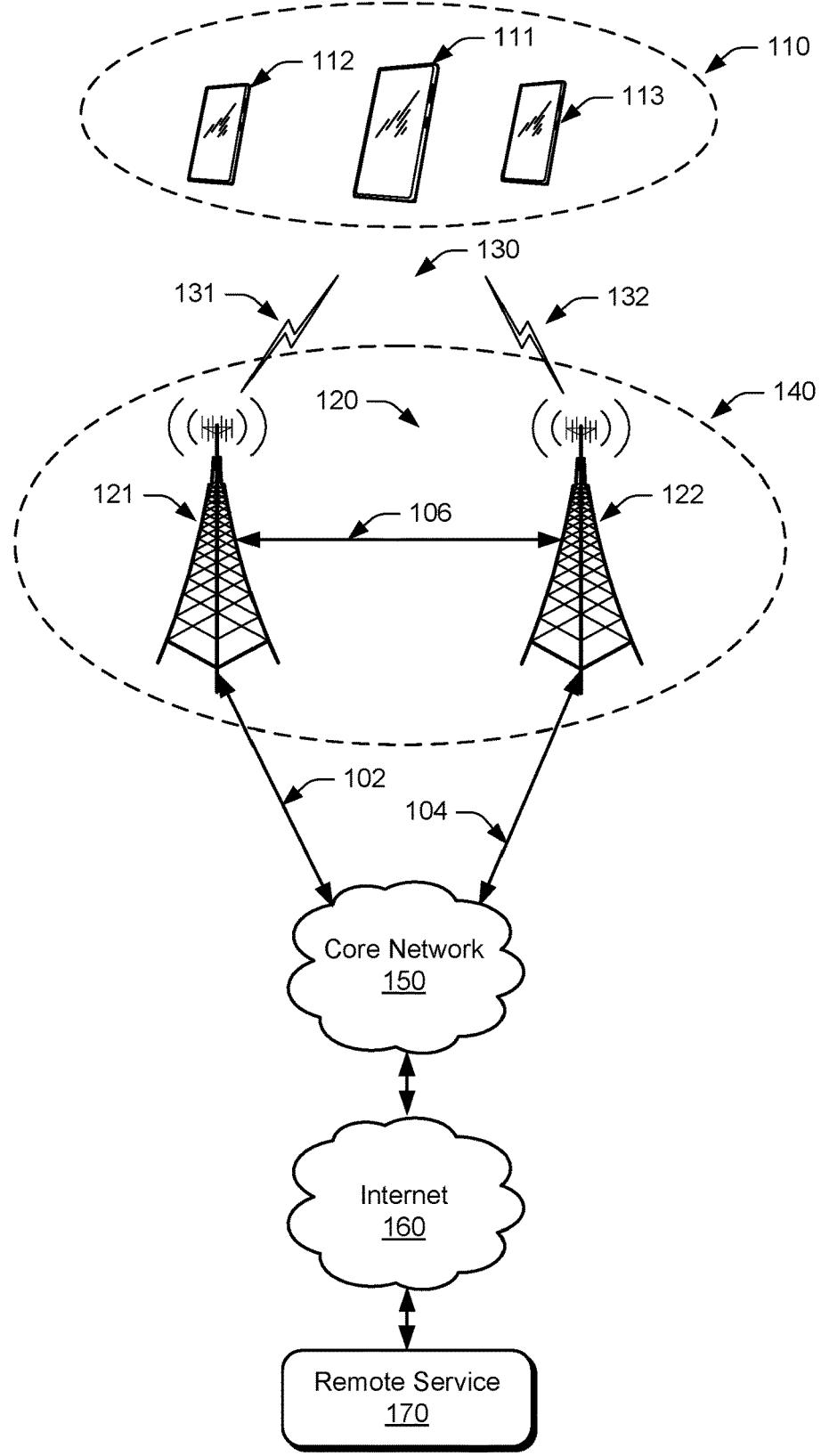
FIG. 1 illustrates an example environment in which various aspects of the base-station-initiated grant revoke can be implemented.

This document describes techniques using, and devices enabling, a base-station-initiated grant revoke. As noted, a fifth-generation new radio (5G) network can be implemented as a high-density network that simultaneously provides a wide variety of services to multiple users with different demands from time-critical applications and varying requirements for data rate, capacity, reliability, and/or latency. The 5G network generally has the capability to meet the needs of these diverse services. In some cases, however, conditions such as excessive radio-frequency (RF) interference or priority conflicts (e.g., between timing-critical applications, such as video calls or remote real-time gaming) may lead to avoidable performance degradation or other trade-offs, even when there are unused or under-utilized network resources.

In contrast, the described techniques allow a base station to generate a user-equipment identifier (UE identifier) and assign the UE identifier to a user equipment. The UE identifier can be any of a variety of identifiers, such as a radio network temporary identifier (RNTI). The base station can also generate and transmit a grant-revocation message (GRM) that is associated with the UE identifier. The GRM can be used to revoke a specific UL or DL grant to the user equipment that has been assigned the UE identifier. The base station cancels the grant specified in the GRM and transmits the GRM to the user equipment. The transmitted GRM terminates a scheduled network transmission, defined by the GRM, between the base station and the user equipment and notifies the user equipment that the scheduled transmission has been terminated. In some implementations, the revoked grant may be a scheduled or in-progress grant.

The base station may transmit the GRM to the user equipment using a variety of lower layer connections, including a physical downlink control channel (PDCCH) transmission or Radio Resource Control (RRC) signaling. For example, a revoke-physical-downlink-control channel (R-PDCCH) can be used. Thus, the base station can take advantage of the GRM to revoke an UL or DL grant. In this way, the base station can address priority conflicts, quality of service (QoS) issues, interference issues, thermal issues, and back-up battery-capacity challenges, while conserving network resources that can be used by other devices on the network.

In some cases, the base station may generate the GRM in response to a trigger event, such as excessive RF interference or because another user equipment has a higher-priority need for network resources. For example, an RF-interference-based trigger event can be an RF noise level that exceeds a threshold (e.g., caused by RF noise or signals at a frequency or in a frequency band near the frequency of the UL or DL transmission). Another RF-related trigger event can be a signal-to-noise (SNR) ratio, or a signal-to-artificial-noise ratio (SANR), for the UL or DL transmission transmitted from or to the user equipment that falls below a threshold value (e.g., a SNR or SANR of less than 15 dB, less than 20 dB, or less than 25 dB). Similarly, a priority-based trigger event can occur when a grant for a lower-priority application or user equipment is scheduled and a grant for a higher-priority application or user equipment cannot be scheduled within its required time frame, because of the pre-existing lower-priority grant. The priority-based trigger events can also be based at least in part on QoS techniques or parameters. Other trigger events may be battery-capacity-based or thermal-based (e.g., a remaining battery-capacity level at the base station falling below a capacity threshold or a value of a thermal parameter of the base station exceeding a thermal threshold).

Consider, for example, a base station that has granted network resources to multiple user equipment. The base station then determines that a priority conflict exists between two of the user equipment (e.g., resources needed for a higher-priority grant, such as for a video call, are unavailable because of a lower-priority grant to transmit a text message). If the base station fulfills the lower-priority grant, the video call application may not have adequate network resources it needs to provide low-latency, high-quality video and audio services. In contrast, using the described techniques, the base station can transmit the GRM to revoke the lower-priority grant, which frees the resources that were dedicated to the revoked grant for use in the higher-priority video call. This can improve latency, quality, and reliability for the video call application and increase network efficiency, while the text message can be transmitted without significant delay during a subsequent grant.

While features and concepts of the described systems and methods for the base-station-initiated grant revoke can be implemented in any number of different environments, systems, devices, and/or various configurations, aspects of the base-station-initiated grant revoke are described in the context of the following example devices, systems, and configurations.

Example Environment

FIG. 1 illustrates an example environment 100 in which various aspects of the base-station-initiated grant revoke can be implemented. The example environment 100 includes multiple user equipment 110, illustrated as user equipment 111, user equipment 112, and user equipment 113. Each user equipment 110 can communicate with one or more base stations 120 (illustrated as base stations 121 and 122) through one or more wireless communication links 130 (wireless link 130), illustrated as wireless links 131 and 132. In this example, the user equipment 110 is implemented as a smartphone. Although illustrated as a smartphone, the user equipment 110 can be implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) can be implemented in a macrocell, microcell, small cell, picocell, and the like, or any combination thereof.

The base stations 120 communicate with the user equipment 110 using the wireless links 131 and 132, which can be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150 (e.g., an Evolved Packet Core (EPC) or 5G Core (5GC) network). The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Figure 2:
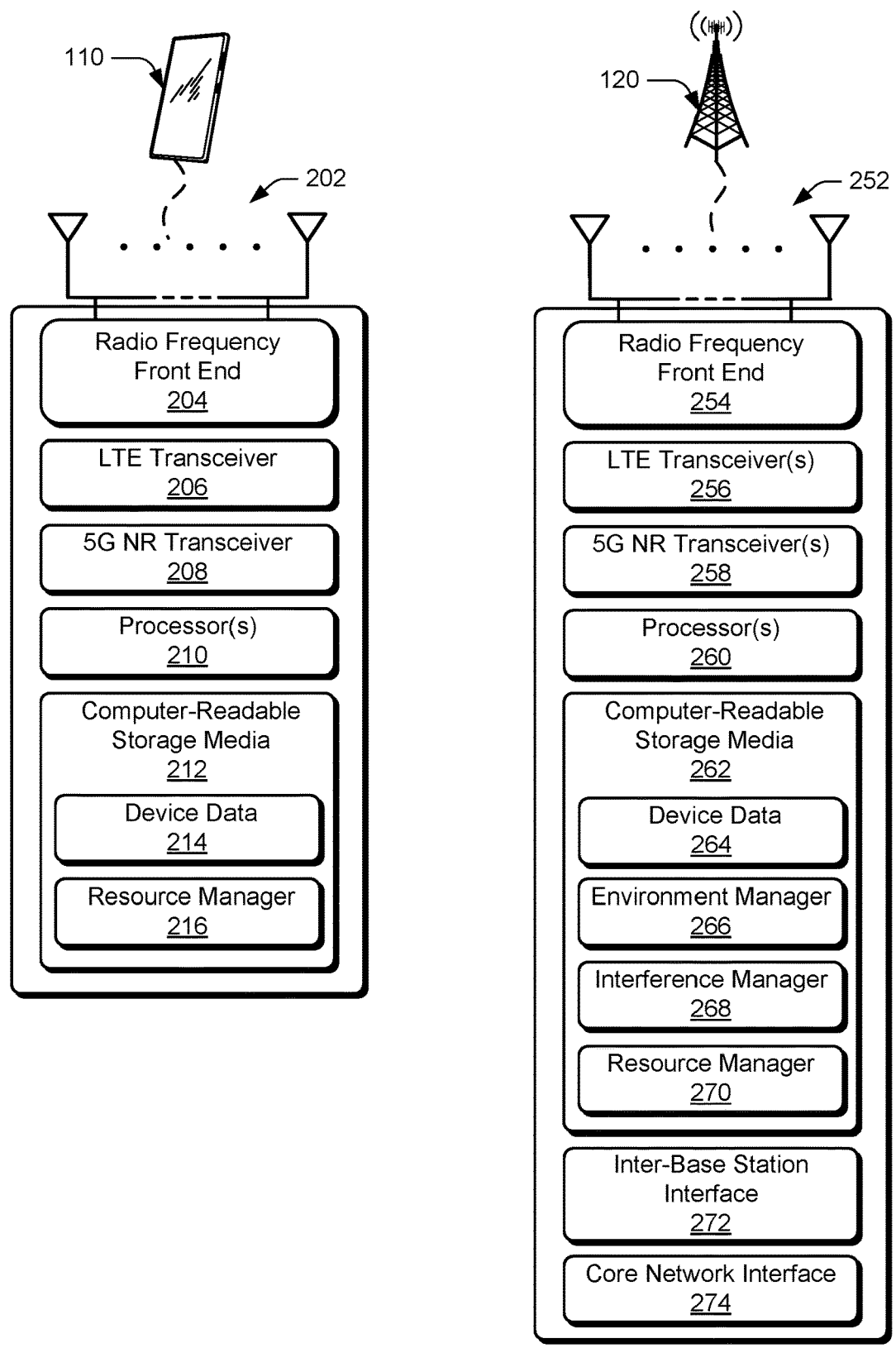
FIG. 2 illustrates an example device diagram of a user equipment and a base station that can implement various aspects of the described techniques.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio-frequency front end 204 (RF front end 204), an LTE transceiver 206, and a 5G NR transceiver 208 for communicating with base stations 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5GNR transceiver 208. Additionally, the antennas 202, the RF front end 204, the LTE transceiver 206, and/or the 5GNR transceiver 208 can be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 can have a single core processor or multiple core processors composed of a variety of materials, such as silicon, polysilicon, high-K dielectric, copper, and so on. The computer-readable storage media described herein excludes propagating signals. The CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

CRM 212 may also include a resource manager 216. Alternately or additionally, the resource manager 216 can be implemented in whole or part as hardware logic or circuitry integrated with or separate from other components of the user equipment 110. In at least some aspects, the resource manager 216 configures the RF front end 204, the LTE transceiver 206, and/or the 5G NR transceiver 208 for communication with the base stations 120. Further, the resource manager 216 may be configured to implement the techniques for a base-station-initiated grant revoke described herein. For example, the resource manager 216 may receive the GRM from the base stations 120. Based at least in part on the GRM, the resource manager 216 may determine whether to request or reschedule network resources (e.g., to address resources canceled or revoked, as described in the GRM).

The device diagram for the base stations 120, shown in FIG. 2, includes a single network node (e.g., a gNode B). The functionality of the base stations 120 can be distributed across multiple network nodes or devices and can be distributed in any fashion suitable to perform the functions described herein. The base stations 120 include antennas 252, a radio-frequency front end 254 (RF front end 254), one or more LTE transceivers 256, and/or one or more 5G NR transceivers 258 for communicating with the user equipment 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 can be configured to support beamforming, such as Massive-MIMO, for the transmission and reception of communications with the user equipment 110.

The base stations 120 also include processor(s) 260 and computer-readable storage media 262 (CRM 262). The processor 260 can have a single core processor or multiple core processors composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The CRM 262 may exclude propagating signals. The device data 264 includes network scheduling data, radio resource management data, beamforming codebooks, applications, and/or an operating system of the base stations 120, which are executable by processor(s) 260 to enable communication with the user equipment 110.

In some implementations, the CRM 262 may also include one or more of an environment manager 266 or a radio-frequency interference manager 268 (interference manager 268). The environment manager 266 can communicate with various sensors in or associated with the base stations 120. For example, the environment manager 266 can include a thermal sensor (e.g., a thermistor or other temperature or heat sensor), which measures temperature and other thermal properties of the base stations 120 (including individual measurements of various components of the base stations 120). The environment manager 266 can also include a power module (not shown in FIG. 2) that can monitor and manage a battery (or batteries) of the base stations 120 (e.g., a back-up power supply). The environment manager 266 can also store and transmit values of the various measurements to other components of the base stations 120 or to other devices.

The interference manager 268 can communicate with one or more RF interference detectors (not shown in FIG. 2), which can detect interference caused by RF noise or signals that may interfere with transmissions between the base stations 120 and the user equipment 110 (e.g., an RF jammer detector, an RF sniffer, or another RF signal or interference detector). The RF-signal detector can be part of, or separate from the base stations 120 (e.g., a component of the base stations 120 or a separate component that can communicate with the base stations 120). The interference manager 268 can also store and transmit information, related to RF interference, to other components of the base stations 120 or to other devices. Further, while shown as part of the CRM 262 in FIG. 2, either or both of the environment manager 266 or the interference manager 268 may be implemented in whole or part as hardware logic or circuitry integrated with or separate from other components of the base stations 120.

CRM 262 also includes a resource manager 270. Alternately or additionally, the resource manager 270 can be implemented in whole or part as hardware logic or circuitry integrated with or separate from other components of the base stations 120. In at least some aspects, the resource manager 270 configures the LTE transceivers 256 and the 5G NR transceivers 258 for communication with the user equipment 110, as well as communication with a core network, such as the core network 150. Additionally, the resource manager 270 may perform one or both of managing or scheduling DL transmissions to the user equipment 110. The resource manager 270 may also perform any one or more of assigning the UE identifier to the user equipment 110, canceling a grant specified by the GRM, or transmitting the GRM to the user equipment 110, in order to revoke a previously granted UL or DL grant. The resource manager can also determine priority conflicts between requested, scheduled, and granted resources. In some cases, the resource manager 270 may detect the trigger event and revoke an UL or DL grant, based at least in part on the trigger event.

The base stations 120 may also include an inter-base station interface 272, such as an Xn and/or X2 interface, which the resource manager 270 configures to exchange user-plane and control-plane data between other base stations 120, to manage the communication of the base stations 120 with the user equipment 110. The base stations 120 also include a core network interface 274, which the resource manager 270 configures to exchange user-plane and control-plane data with core network functions and entities.

Air Interface Resources

Figure 3:
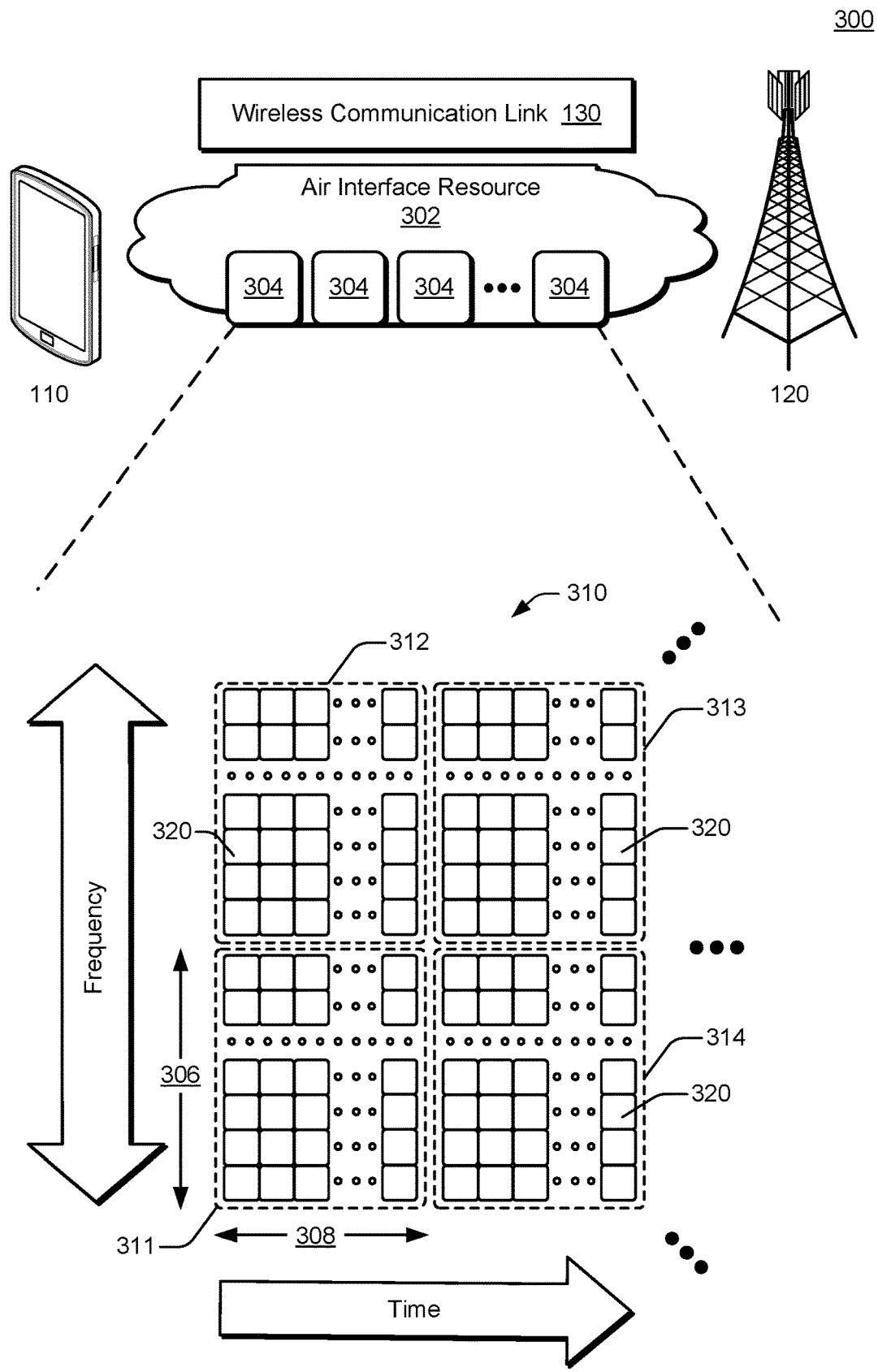
FIG. 3 illustrates an air interface resource that extends between a user equipment and a base station and with which various aspects of the described techniques can be implemented.

FIG. 3 illustrates generally at 300, an air interface resource that extends between a user equipment and a base station and with which various aspects of the base-station-initiated grant revoke can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources can be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The resource manager 270 (shown in FIG. 2) may manage or schedule DL transmissions from the base stations 120 to one or more user equipment 110. The resource manager 270 may also determine UL or DL grants to be revoked or transmissions to be canceled, a type or amount of information (e.g., data or control information) to be communicated (e.g., transmitted) by the user equipment 110. For example, the resource manager 270 can determine that a particular UL or DL grant is to be revoked, in whole or in part (e.g., based on a GRM, as described herein), or paused, or rescheduled. The resource manager 270 can then revoke, allocate, and/or reallocate one or more resource blocks 310 to each user equipment 110 based on the GRM or, after receiving the GRM, the resource manager 270 reallocates one or more resource blocks 310 for another UL or DL grant or transmission for a same or different equipment 110. The air interface resource 302 can also be used to transmit the GRM, as described herein.

Additionally or in the alternative to block-level resource grants, the resource manager 270 may allocate resource units at an element-level. Thus, the resource manager 270 may allocate one or more resource elements 320 or individual subcarriers to different user equipment 110. By so doing, one resource block 310 can be allocated to facilitate network access for multiple user equipment 110. Accordingly, the resource manager 270 may allocate, at various granularities, one or up to all subcarriers or resource elements 320 of a resource block 310 to one user equipment 110 or divided across multiple user equipment 110, thereby enabling higher network utilization or increased spectrum efficiency. Additionally or alternatively, the resource manager 270 may, using the GRM described herein, revoke, in whole or in part, an UL or DL grant or transmission and reallocate or change the allocation of air interface resources for a carrier, subcarrier, or carrier band, and/or for a time interval or subinterval.

The resource manager 270 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the resource manager 270 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, or both to communicate using the allocated resource units 304 of the air interface resource 302.

Base-Station-Initiated Grant Revoke

In aspects, the base stations 120 can assign a user-equipment identifier (UE identifier) to the user equipment 110. The UE identifier can be, for example, a radio network temporary identifier (RNTI), such as a dedicated Revoke-RNTI (R-RNTI) or an existing RNTI such as a Cell-RNTI (C-RNTI). The base stations 120 can also detect a trigger event and, in response to the trigger event, generate a grant-revocation message (GRM). The GRM is associated with the UE identifier. For example, the GRM may include the UE identifier (e.g., the GRM may comprise a field in which a UE identifier can be stored) or may be scrambled with the UE identifier (e.g., when the UE identifier is an R-RNTI, as described in more detail below). The GRM specifies the grant to be revoked, which may be either or both of a DL grant using a physical downlink shared channel (PDSCH) or a UL grant using a physical uplink shared channel (PUSCH). In other words, the GRM specifies that a grant of downlink resources on a PDSCH is revoked and/or that a grant of uplink resources on a PUSCH is revoked.

The base stations 120 also cancel or retract the grant specified in the GRM and transmit the GRM to the user equipment 110 (e.g., to the user equipment 110 to which the revoked grant was originally made). When the specified grant is canceled or retracted, the previously scheduled transmission of the information-in-queue (e.g., data that was to be transmitted from the user equipment or of information the user equipment expected to receive) is not performed. The transmission may be rescheduled using any suitable technique or protocol. For example, the transmission may be rescheduled using an automatic repeat request (ARQ) or an upper-layer hybrid automatic repeat request (HARQ). In some implementations, the information may be held and delayed (e.g. in an UL or DL queue for the next dynamically scheduled transmission).

In some implementations, the transmitted GRM may terminate a scheduled network transmission, defined by the GRM, between the base stations 120 and the UE. The GRM may instead or also notify or instruct the user equipment 110 to temporarily stop looking for data on the revoked DL resources and/or to temporarily stop sending data on the revoked UL resources. The base stations 120 may perform the described techniques in a variety of manners, such as using a module or manager (e.g., the resource manager 270).

For clarity in this application, communications to and from the base stations 120 to perform aspects of the base-station-initiated grant revoke are described as communications to and from the base station 121. As noted with reference to FIGS. 1 and 2, however, the base stations 120 may include multiple base stations (e.g., the base stations 121 and 122), which can communicate with each other using an X2 interface or an XnAP (as shown in FIG. 1 at 106) or using the inter-base station interface 272 (as shown in FIG. 2). Thus, communication between one or more of the base stations 120 and one or more of the user equipment 110 (including the user equipment 11-113) may be described as communication between the base station 121 and the user equipment 110, even though multiple base stations 120 and/or multiple user equipment may be involved in a same or similar communication. Specific examples of communication that includes multiple base stations 120 are described below.

In some implementations, the base station 121 can assign a common UE identifier to each respective user equipment 110 of a plurality of user equipment (e.g., the user equipment 111, the user equipment 112, and the user equipment 113). The base stations 120 can then transmit the GRM to each of the user equipment 111, 112, and 113 using a broadcast or multicast message that is associated with the common UE identifier. In this case, the common UE identifier may be a dedicated Group-RNTI (G-RNTI) or another aggregated or collective user equipment identification. For example, a broadcast/multicast message can be a point-to-multipoint (PTM) transmission (e.g., a single-cell PTM (SC-PTM) transmission using a Multicast Traffic Channel (MTCH) or a Single Cell Multicast Traffic Channel (SC-MTCH)), a PDSCH transmission using SC-PTM on the physical layer, or a transmission using a multimedia broadcast-multicast service (MBMS) or an evolved MBMS (eMBMS).

As noted, in some implementations the UE identifier is an RNTI, such as a C-RNTI, a dedicated R-RNTI, or a G-RNTI. The RNTI is a user equipment identification that can be used to scramble or encode a part of the PDCCH transmission (e.g., part of a downlink control information (DCI)) so that only a user equipment that has been assigned the particular RNTI can decode the transmission. Thus, only the intended grant and user equipment (or multiple user equipment), specified in the GRM, will be revoked. An R-RNTI is an RNTI that is used for scrambling or encoding a GRM. In this manner, the GRM can be descrambled or decoded only by a user equipment to which that GRM has been assigned. Note that other individual or group UE identifiers may be used to enable the described techniques for a base-station-initiated grant revoke, such as a globally unique temporary identifier (e.g., 5G-GUTI), a permanent equipment identifier (PEI), a subscriber or subscription identity (e.g., a 5G subscription permanent identifier (SUPI)), or another identifier that uniquely identifies the user equipment 110 and a control channel (e.g., a PDCCH).

The trigger event can be any of a variety of events, such as a determination that there is a priority conflict between multiple simultaneous (or nearly simultaneous) grants (e.g., a scheduled UL grant may have a lower priority than a requested DL grant in a case in which the base station 121 can provide only one of the grants). In some cases, the trigger event can be determining that a signal-to-noise ratio (SNR) or a signal-to-artificial-noise ratio (SANR) for the connection between the base station 121 and the user equipment 110 falls below a threshold or detecting an RF signal, or an effect of an RF signal, that may interfere with an UL or DL grant or transmission (e.g., RF interference). Additionally or alternatively, the trigger event can be based on determining that a value of a thermal, power-consumption, or battery-capacity parameter of the base station 120 exceeds or falls below a threshold.

In some cases, the GRM may include additional information specifying details of the grant, or a portion of the grant, that is to be revoked. For example, the GRM can include a grant identification along with a layer or beam identifier to describe or specify a particular physical downlink shared channel (PDSCH) layer or a particular physical uplink shared channel (PUSCH) layer or beam direction of the grant or transmission that is to be revoked. Consider a MIMO transmission, in which a particular beam may correspond to a lower modulation and coding scheme (MCS) index value and another beam may correspond to a higher MCS index value. In this case, the GRM may revoke only the layer corresponding to the beam or beams with the higher MCS index value (e.g., above a threshold MCS index value) because beams using a higher MCS are more sensitive to RF interference. In this way, the GRM can be used to revoke a portion of a grant or transmission while maintaining the grant or transmission for other beams and layers.

In another example, the GRM includes an indication of specific time and frequency resources of the UL or DL grant that are to be revoked. For example, an UL or DL grant may include a number of resource units or blocks (e.g., 10, 25, or 50 resource elements), as described with reference to FIG. 3 (e.g., particular frequency or time blocks or slots or a particular number of OFDM symbols). The GRM may specify a subset of the granted resource units or blocks, so that only a portion of the granted time and frequency resource are revoked. The subset specified in the GRM can include any one or more of particular frequencies, times, or symbols to be revoked. In one example, a low latency but high priority application on the user device 110 may utilize only a small part of the frequency or slot duration of a scheduled grant. Using the described techniques to revoke unused resource blocks, the revoked resources are free to be reallocated.

The base station 121 can transmit the GRM to the user equipment 110 using any of a variety of transmission or signaling techniques. For example, the base station 121 (using, for example, the resource manager 270) can transmit the GRM using a PDCCH transmission. For example, the base station 121 can transmit the GRM using a revoke-physical-downlink-control-channel (R-PDCCH) transmission that is associated with the UE identifier (e.g., the R-RNTI). The R-PDCCH is a dedicated control channel used for transmitting the GRM. The R-PDCCH may be dedicated for use only to transmit the GRM, for use by only a single user equipment, or both. The R-PDCCH is associated with the R-RNTI, so that only the user equipment 110 to which the associated R-RNTI has been assigned can decode the R-PDCCH. In this way, the UL or DL grant is revoked only for the properly intended user equipment 110.

Note that for implementations in which the UE identifier is the existing C-RNTI, the base station 121 may use the PDCCH transmission rather than the R-PDCCH. In this case, the base station 121 adds a new field in the PDCCH that corresponds to the C-RNTI, the new field indicating that the PDCCH transmission is a grant-revocation transmission or control message. In some implementations, the new field increases the length of the PDCCH. In other implementations, the new field may be added to the PDDCH without increasing the length.

Further, in some implementations, the PDCCH that is used to provide the DL grant or the UL grant (e.g., not the R-PDCCH or the PDCCH that includes the new field for grant-revocation) can include an indication of one or more of a particular time resource or a particular frequency resource that carries the corresponding R-PDCCH (or modified PDCCH). For example, the base station 121 can modify the PDCCH used to provide the grant to include an indication of the resources (e.g., a time slot or range, a frequency slot or range, a number of orthogonal frequency-division multiplexing (OFDM) symbols, or another resource indicator) that are used by the R-PDCCH. This indication enables the user equipment 110 to locate the R-PDCCH faster if the grant is revoked by the base station 121.

In some cases, the base station 121 (e.g., the resource manager 270) can store and use information associated with one or more revoked grants. For example, the resource manager 270 can store the information in the CRM 262, the device data 264, or another storage device or location. The resource manager 270 can then use the stored information to manage or reallocate network resources that were previously intended for the one or more revoked grants or partial grants.

In some implementations, the grant that is to be revoked and the GRM may be provided or transmitted using a same or a different radio access technology (RAT). For example, the base station 121 may be used to provide an UL or DL grant (e.g., the grant that is to be revoked) to the user equipment 110 and the base station 122 may be used to transmit the GRM to the user equipment 110. In another example, the base station 121 may be used to provide the UL or DL grant that is to be revoked and relay the GRM to the base station 122, which transmits the GRM to the user equipment 110. The base station 121 and the base station 122 can be a same or different type of base station (e.g., a 5G NR base station or an E-UTRA base station) and may communicate using any suitable means, such as an Xn interface. Thus, the base station 121 can provide the UL or DL grant that is to be revoked using a particular radio access technology (RAT), such as using a 5G NR downlink connection, and the base station 122 can transmit the GRM to the user equipment 110 using another RAT, such as an LTE connection.

Additionally or alternatively, the base station 121 may provide the grant that is to be revoked using a first carrier or sub-carrier and the base station 121 may transmit the GRM to the user equipment 110 (e.g., using the R-PDCCH) using a second carrier or a different sub-carrier of the first carrier. It should be noted that the methods and techniques described herein as being performed by either or both of the user equipment 110 or any one or more of the base stations 120 may be performed using applications or modules described herein, such as either or both of the resource manager 216 or the resource manager 270.

Example Methods

Example method 400 is described with reference to FIG. 4 in accordance with one or more aspects of a base-stationinitiated grant revoke. The order in which the method blocks are described is not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
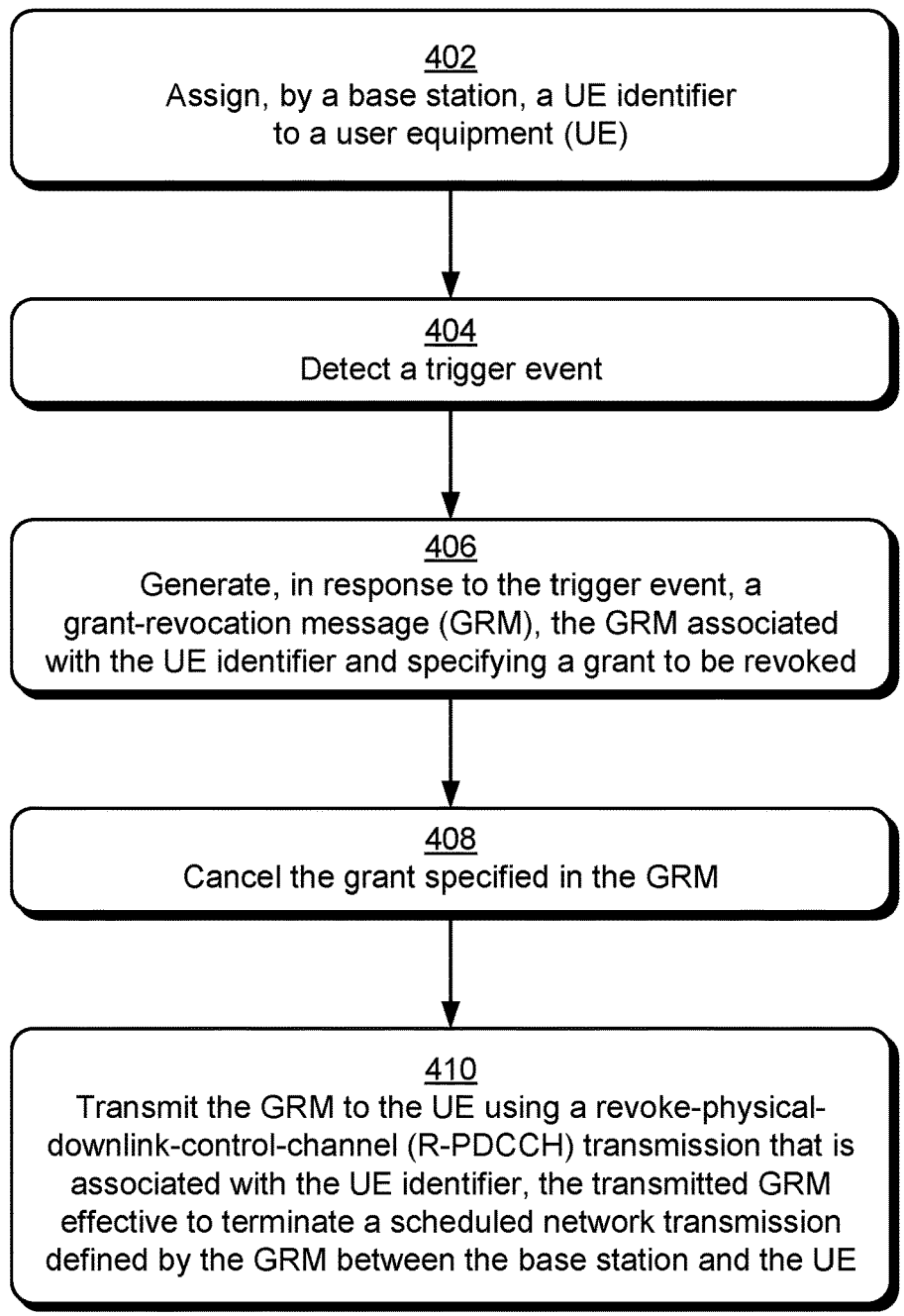
FIG. 4 illustrates an example method for the base-station-initiated grant revoke as generally related to techniques that allow a base station to revoke an uplink or downlink grant, in accordance with aspects of the techniques described herein.

FIG. 4 illustrates an example method(s) 400 for the base-station-initiated grant revoke as generally related to techniques that allow a base station to revoke either or both of a DL grant using the PDSCH or an UL grant using the PUSCH. The revocation is based at least in part on a grant-revocation message (GRM) that is transmitted from the base station 121 to the user equipment 110 in response to an occurrence of a trigger event. The trigger event may be related to a priority conflict, RF interference, or other factors, as described herein.

At block 402, the base station assigns a user-equipment-identifier (UE identifier) to the user equipment. For example, the base station 121 can assign the UE identifier to the user equipment 110 or assign a common UE identifier to multiple user equipment 110 (e.g., the user equipment 111, the user equipment 112, and the user equipment 113). The UE identifier can be any of a variety of identifiers that can uniquely identify the user equipment and allow the user equipment to decode the GRM. In some cases, the UE identifier is a radio network temporary identifier (RNTI), such as a dedicated Revoke-RNTI (R-RNTI) or G-RNTI, as described herein, or an existing RNTI such as a Cell-RNTI (C-RNTI). As described above, the RNTI is a user equipment identification that can be used to scramble or encode a message or part of a message (e.g., a physical downlink control channel (PDCCH) transmission) so that only a user equipment that has been assigned the particular RNTI can decode the transmission.

At block 404, the base station detects a trigger event. Generally, the trigger event indicates a condition or state of the network environment, the base station, or the user equipment that may be addressed by revoking an UL or DL grant. For example, the trigger event may be related to priority or quality-of-service (QoS) factors, performance issues, safety, battery capacity, or power-consumption. In some cases, the trigger event may occur when the base station 121 detects a priority conflict between multiple simultaneous (or nearly simultaneous) grants (e.g., a scheduled UL grant may have a lower priority than a requested DL grant in a case in which the base station 121 can provide only one of the grants). In other cases, as described herein, the trigger event can be RF interference that causes an RF noise level to exceed a noise threshold or a SNR/SANR of the grant that is to be revoked that falls below a threshold value (e.g., a SNR or SANR of less than 15 dB, 20 dB, or 25 dB).

Additionally or alternatively, the trigger event may occur if a power-consumption parameter of the base station 121 exceeds a threshold, if a total energy transmitted level exceeds a threshold, or a battery-capacity level (e.g., of a back-up battery of the base station 121) falls below a battery-capacity threshold. For example, the trigger event may be based on determining that the base station 121 is consuming power at a rate that is 30, 20, or 15 percent higher than an expected rate, that the energy transmitted by the base station is at 90, 95, or 100 percent of a threshold, or that the remaining capacity of the back-up battery has fallen below a threshold percentage (e.g., 25, 15, or 5 percent) or below an estimated remaining battery life (e.g., 90, 60, or 30 minutes). The trigger event may also or instead be thermal-based, such as a thermal parameter of the base station 121 exceeding a thermal threshold, such as a particular temperature, a duration operating at a temperature above a temperature threshold, or a percentage of a maximum safe operating temperature (e.g., 90, 75, or 60 percent).

The base station 121 may detect the trigger event in any of a variety of manners. For example, the base station 121 may communicate with any one or more of the environment manager 266, the interference manager 268, or the resource manager 270 to detect priority-conflict-, RF interference-, performance-, thermal-, battery-capacity-, or power-based trigger events. The trigger event may also be a weighted combination of various inputs (e.g., signals from one or more of the managers or modules described herein, and potentially other elements of any one or more of the base stations 120, such as one or more of the transceivers 256 or 258).

At block 406, in response to the trigger event, the base station generates the GRM. For example, when the base station 121 detects the trigger event (e.g., that a priority conflict exists between multiple simultaneous or near-simultaneous grants or that the RF noise level exceeds the RF noise threshold), the base station 121 generates a GRM that is associated with the UE identifier and that specifies the grant (e.g., an UL or DL grant) to the user equipment 110 that is to be revoked.

Generally, the GRM is a notification from the base station 121 regarding a revocation of UL or DL resources granted to the user equipment 110. More specifically, as described herein, the GRM may include information that specifies a part or portion of the UL or DL grant that is to be revoked, such as a layer identification or a beam identification of a particular PDSCH or PUSCH layer or of a particular beam or beam direction that is to be revoked. In this way, the GRM can be used to revoke a portion of a grant or transmission while maintaining the grant or transmission for other beams and layers. Similarly, as described herein, the GRM can include an indication of specific time and frequency resources of the UL or DL grant that are to be revoked (e.g., particular frequency or time blocks or slots or a particular number OFDM symbols, as described with reference to FIG. 3). By using the described techniques to revoke unused or under-utilized resources blocks, the base station 121 can reallocate the revoked resources.

At block 408, the base station cancels the resource grant specified in the GRM. For example, the base station 110 can cancel the grant of UL or DL resources to the user equipment 110, which is specified in the transmitted GRM. As noted, when the specified grant is canceled or retracted, the previously scheduled transmission of the information-in-queue is not performed. The transmission may be rescheduled using any suitable technique or protocol (e.g., using an ARQ or HARQ request) or held and delayed (e.g., in an UL or DL queue for the next dynamically scheduled transmission).

At block 410, the base station transmits the GRM to the user equipment. For example, the base station 121 (or the resource manager 270) transmits the GRM to the user equipment 110. As noted, the transmitted GRM may terminate a scheduled network transmission, between the base station 121 and the user equipment 110, defined by the GRM. The GRM may instead or also notify or instruct the user equipment 110 to stop (or pause) looking for data on the revoked DL resources and/or to stop (or pause) sending data on the revoked UL resources. The base station 121 may transmit the GRM to the user equipment 110 using any of a variety of techniques, including using a dedicated PDCCH transmission that is associated with the UE identifier, such as the R-PDCCH transmission, as described above.

As noted, in some implementations the GRM can be transmitted to the user equipment 110 using an existing RNTI, such as the C-RNTI, in which case the base station 121 adds a new field in the PDCCH that corresponds to the C-RNTI. The new field indicates that the PDCCH transmission is a grant-revocation transmission or control message. As noted, the new field may increase the length of the PDCCH. Further, in some implementations as described herein, the base station 121 can modify the PDCCH that is used to provide the DL grant or the UL grant to include an indication of one or more of a particular time, frequency, or OFDM resource that carries the corresponding R-PDCCH (e.g., a time slot or range, a frequency slot or range, or a number of OFDM symbols). This indication enables the user equipment 110 to locate the R-PDCCH faster if the grant is revoked by the base station 121.

In some cases, the base station 121 can store and use information associated with one or more revoked grants. For example, the resource manager 270 can store the information in the CRM 262, the device data 264, or another storage device or location. The base station 121 can then use the stored information to manage or reallocate network resources that were previously intended for the one or more revoked grants or partial grants.

In some implementations, as described above, the grant that is to be revoked and the GRM may be provided or transmitted using a same or a different radio access technology (RAT). For example, the base station 121 may be used to provide an UL or DL grant to the user equipment 110, and the base station 122 may be used to transmit the GRM to the user equipment 110. In another example, the base station 121 may be used both to provide the UL or DL grant and to relay the GRM to the base station 122, which then transmits the GRM to the user equipment 110. The base stations 121 and 122 may be a same or different type of base station (e.g., a 5G NR base station or an E-UTRA base station) and may communicate using any suitable means, such as an Xn interface. Thus, the base station 121 can provide the UL or DL grant using a particular radio access network (RAT), such as using a 5G NR downlink connection, and the base station 122 can transmit the GRM to the user equipment 110 using another RAT, such as an LTE connection.

Additionally or alternatively, the base station 121 can provide the grant that is to be revoked using a first carrier or sub-carrier and the base station 121 can transmit the GRM to the user equipment 110 using a second carrier or a different sub-carrier of the first carrier. It should be noted that the methods and techniques described herein as being performed by either or both of the user equipment 110 or the base stations 120 may be performed using applications or modules described herein, such as either or both of the resource manager 216 or the resource manager 270.

Several examples of base-station-initiated grant revoke are described in the following paragraphs.

Example 1: A method for revoking a grant to a user equipment, UE, by a base station, the method comprising the base station: assigning a UE identifier to the UE; detecting a trigger event; in response to the trigger event, generating a grant-revocation message, GRM, the GRM associated with the UE identifier and specifying a grant to be revoked; canceling the grant specified in the GRM; and transmitting the GRM to the UE using a revoke-physical-downlink-control-channel, R-PDCCH, transmission that is associated with the UE identifier, the transmitting effective to terminate a scheduled network transmission between the base station and the UE defined by the GRM.

Example 2: The method of example 1, wherein the UE identifier comprises a radio network temporary identifier, RNTI.

Example 3: The method of example 2, wherein the RNTI comprises a Revoke-RNTI, R-RNTI.

Example 4: The method of example 2, wherein the RNTI comprises a Cell-RNTI, C-RNTI.

Example 5: The method of any of the preceding examples, wherein a PDCCH that is used to provide the grant specified in the GRM includes an indication of one or more of: a time resource that carries the corresponding R-PDCCH; or a frequency resource that carries the corresponding R-PDCCH.

Example 6: The method of any of the preceding examples, wherein the GRM specifies one or more of: a downlink grant using a physical downlink shared channel, PDSCH; or an uplink grant using a physical uplink shared channel, PUSCH.

Example 7: The method of example 6, wherein the GRM further comprises one or more of an indication of: time and frequency resources of the PDSCH grant that are to be revoked; or time and frequency resources of the PUSCH grant that are to be revoked.

Example 8: The method of any of the preceding examples, wherein the GRM further comprises: one or more of a grant identification, a layer indication, or a beam identification, and the GRM is effective to revoke one or more of: a PDSCH layer specified by the layer indication; a PUSCH layer specified by the layer indication; or a grant from a beam direction specified in the beam identification.

Example 9: The method of any of the preceding examples, wherein the UE identifier is a first UE identifier and wherein: the assigning the first UE identifier further comprises assigning a common UE identifier to each respective UE of a plurality of UEs, the plurality of UEs including the first UE identifier; and the transmitting the GRM further comprises transmitting the GRM to each respective UE of the plurality of UEs using a point-to-multipoint transmission that is associated with the common UE identifier.

Example 10: The method of example 9, wherein the common UE identifier comprises a Group-RNTI, G-RNTI.

Example 11: The method of any of the preceding examples, wherein the detecting the trigger event comprises determining one or more of: a priority conflict exists between a first grant and a second grant; a signal-to-noise ratio or a signal-to-artificial-noise ratio of a connection between the UE and the base station falls below a threshold; a value of a battery-capacity level of the base station falls below a battery-capacity threshold; a value of a power-consumption parameter of the base station exceeds a power-consumption threshold; or a value of a thermal parameter of the base station exceeds a thermal threshold.

Example 12: The method of any of the preceding examples, further comprising: storing information associated with one or more revoked grants; and reallocating, based on the stored information, network resources from revoked grants to another UE.

Example 13: The method of any of the preceding examples, further comprising the base station: providing the grant to be revoked using a first RF carrier; and transmitting the GRM using a second RF carrier.

Example 14: The method of any of the preceding examples, further comprising the base station: providing the grant to be revoked using a first radio access technology, RAT; and transmitting the GRM using a second RAT.

Example 15: A base station, comprising: a radio-frequency, RF, transceiver; and a processor and memory system to perform the methods of any of the preceding examples.

Example 16: A method for revoking a grant to a user equipment (UE) by a base station, the method comprising: assigning, by the base station, a UE identifier to the UE; detecting a trigger event; in response to the trigger event, generating a grant-revocation message (GRM), the GRM associated with the UE identifier and specifying a grant to be revoked; canceling the grant specified in the GRM; and transmitting the GRM to the UE, the transmitting effective to terminate a scheduled network transmission between the base station and the UE defined by the GRM.

Example 17: The method of example 16, wherein the UE identifier comprises a radio network temporary identifier (RNTI).

Example 18: The method of example 17, wherein the RNTI comprises: a Revoke-RNTI (R-RNTI); or a Cell-RNTI (C-RNTI).

Example 19: The method of example 16, wherein transmitting the GRM further comprises transmitting the GRM via a revoke-physical-downlink-control-channel (R-PDCCH) transmission that is associated with the UE identifier.

Example 20: The method of example 19, wherein a PDCCH that is used to provide the grant specified in the GRM includes an indication of one or more of: a time resource that carries the corresponding R-PDCCH; or a frequency resource that carries the corresponding R-PDCCH.

Example 21: The method of example 16, wherein the GRM specifies one or more of: a downlink (DL) grant via a physical downlink shared channel (PDSCH); or an uplink (UL) grant via a physical uplink shared channel (PUSCH).

Example 22: The method of example 21, wherein the GRM further comprises: one or more of a grant identification, a layer indication, or a beam identification, and the GRM is effective to revoke one or more of: a PDSCH layer specified by the layer indication; a PUSCH layer specified by the layer indication; or a grant from a beam direction specified in the beam identification.

Example 23: The method of example 21, wherein the GRM further comprises one or more of an indication of: time and frequency resources of the PDSCH grant that are to be revoked; or time and frequency resources of the PUSCH grant that are to be revoked.

Example 24: The method of example 16, wherein the UE identifier is a first UE identifier and wherein: the assigning the first UE identifier further comprises assigning a common UE identifier to each respective UE of a plurality of UEs, the plurality of UEs including the first UE identifier; and transmitting the GRM further comprises transmitting the GRM to each respective UE of the plurality of UEs via a point-to-multipoint (PTM) transmission that is associated with the common UE identifier.

Example 25: The method of example 24, wherein the common UE identifier comprises a Group-radio network temporary identifier (RNTI) (G-RNTI).

Example 26: The method of example 16, wherein the detecting the trigger event comprises determining one or more of: a priority conflict exists between a first grant and a second grant; a signal-to-noise ratio (SNR) or a signal-to-artificial-noise ratio (SANR) of a connection between the UE and the base station falls below a threshold; a value of a battery-capacity level of the base station falls below a battery-capacity threshold; a value of a power-consumption parameter of the base station exceeds a power-consumption threshold; or a value of a thermal parameter of the base station exceeds a thermal threshold.

Example 27: A base station, comprising: a radio-frequency (RF) transceiver; and a processor and memory system to implement a resource manager application configured to: assign a user equipment (UE) identifier to a UE; detect a trigger event; generate, in response to the trigger event, a grant-revocation message (GRM), the GRM associated with the UE identifier and specifying a grant to be revoked; retract the grant specified in the GRM; and transmit the GRM to the UE, the transmitted GRM effective to terminate a scheduled network transmission defined by the GRM between the base station and the UE.

Example 28: The base station of example 27, wherein the UE identifier comprises a radio network temporary identifier (RNTI).

Example 29: The base station of example 28, wherein the RNTI comprises: a Revoke-RNTI (R-RNTI); or a Cell-RNTI (C-RNTI).

Example 30: The base station of example 27, wherein transmitting the GRM further comprises transmitting the GRM via a revoke-physical-downlink-control-channel (R-PDCCH) transmission that is associated with the UE identifier.

Example 31: The base station of example 27, wherein the UE identifier is a first UE identifier and wherein: the assigning the first UE identifier further comprises assigning a common UE identifier to each respective UE of a plurality of UEs, the plurality of UEs including the first UE identifier; and the transmitting the GRM further comprises transmitting the GRM to each respective UE of the plurality of UEs via a point-to-multipoint (PTM) transmission that is associated with the common UE identifier.

Example 32: The base station of example 31, wherein the common UE identifier comprises a Group-radio network temporary identifier (RNTI) (G-RNTI).

Example 33: The base station of example 27, wherein the resource manager application is further configured to: store information associated with one or more revoked grants; and use the stored information to reallocate network resources from revoked grants to another UE.

Example 34: The base station of example 27, wherein: the base station provides a grant via a first RF carrier; and the resource manager application is further configured to transmit the GRM via a second RF carrier.

Example 35: The base station of example 27, wherein: the base station provides a grant that is to be revoked via a first radio access technology (RAT); and the resource manager application is further configured to transmit the GRM via a second RAT.

Example 36: A method for revoking a grant to a user equipment, UE, by a base station, the method being performed at the user equipment and comprising: receiving a UE identifier from a base station; receiving a grant-revocation message, GRM, the GRM associated with the UE identifier and specifying a grant to be revoked; and in response to receiving the GRM, terminating a scheduled network transmission between the base station and the UE defined by the GRM.

Example 37: The method of example 36, further comprising receiving the GRM from the base station in a revoke-physical-downlink-control-channel, R-PDCCH, transmission that is associated with the UE identifier.

Example 38: The method of example 37, further comprising descrambling the R-PDCCH transmission using the UE identifier.

Example 39: A user equipment configured to perform the method of any of examples 36 to 38.

Example 40. A computer-readable medium comprising instructions that, when executed by a processor, cause a user equipment incorporating the processor to perform any of the methods of any of examples 36 to 38.

Although aspects of the base-station-initiated grant revoke have been described in language specific to features and/or methods, the subject of the appended claims is not necessarily limited to the specific features or methods described. Rather, the specific features and methods are disclosed as example implementations of the base-station-initiated grant revoke, and other equivalent features and methods are intended to be within the scope of the appended claims. Further, various different aspects are described, and it is to be appreciated that each described aspect can be implemented independently or in connection with one or more other described aspects.

What is claimed is:

1. A method performed by a base station for reallocating a scheduled grant for a first user equipment (UE) in a wireless network to a second UE in the wireless network, the method comprising:
   detecting a trigger event;
   in response to detecting the trigger event, determining to revoke at least a portion of the scheduled grant;
   generating a grant-revocation message (GRM) that indicates to terminate a scheduled transmission that uses at least the portion of the scheduled grant;
   revoking at least the portion of the scheduled grant by transmitting the GRM to the first UE; and
   reallocating at least the portion of the scheduled grant to the second UE.

2. The method as recited in claim 1, wherein detecting the trigger event further comprises:
   detecting a priority conflict exists between the first UE and the second UE.

3. The method as recited in claim 2, wherein detecting the priority conflict further comprises:
   detecting a quality of service (QoS) issue associated with the second UE; or
   detecting the second UE has a higher-priority grant request than the scheduled grant for the first UE.

4. The method as recited in claim 1, wherein determining to revoke at least the portion of the scheduled grant further comprises:
   determining to revoke a partial grant of the scheduled grant, and
   wherein reallocating at least the portion of the scheduled grant to the second UE further comprises:
   reallocating the partial grant to the second UE.

5. The method as recited in claim 4, wherein determining to revoke the partial grant further comprises:
   determining to revoke at least one of:
   a beam of the scheduled grant;
   a layer of the scheduled grant; or
   a subset of granted resource units or blocks of the scheduled grant.

6. The method as recited in claim 5, further comprising:
   selecting, as the partial grant of the scheduled grant to revoke, a first beam of the scheduled grant that has a higher modulation and coding scheme (MCS) relative to a second MCS of a second beam of the scheduled grant.

7. The method as recited in claim 5, further comprising:
   selecting, as the partial grant of the scheduled grant to revoke, at least one of:
   a physical downlink shared channel (PDSCH) layer of multiple PDSCH layers in the scheduled grant; or
   a physical uplink shared channel (PUSCH) layer of multiple PUSCH layers in the scheduled grant.

8. The method as recited in claim 1, further comprising:
   rescheduling the scheduled transmission that uses at least the portion of the scheduled grant.

9. The method as recited in claim 8, wherein rescheduling the scheduled transmission further comprises:
   rescheduling the scheduled transmission using:
   an automatic repeat request (ARQ); or
   a hybrid automatic repeat request (HARD).

10. The method as recited in claim 1, further comprising:
    providing at least the portion of the scheduled grant to be revoked using a first radio access technology, RAT; and
    transmitting the GRM using a second RAT.

11. A base station, comprising:
    a radio-frequency (RF) transceiver;
    at least one processor; and
    a computer-readable storage memory system including processor-executable instructions that, responsive to execution by at least the one processor, cause the base station to perform operations comprising:
    detecting a trigger event;
    in response to detecting the trigger event, determining to revoke at least a portion of a scheduled grant for a first user equipment (UE) in a wireless network;
    generating a grant-revocation message (GRM) that indicates to terminate a scheduled transmission that uses at least the portion of the scheduled grant;
    revoking at least the portion of the scheduled grant by transmitting the GRM to the first UE; and
    reallocating at least the portion of the scheduled grant to a second UE in the wireless network.

12. The base station as recited in claim 11, wherein the computer-readable storage memory system includes processor-executable instructions that, responsive to execution by at least the one processor, cause the base station to detect the trigger event by:
    detecting a priority conflict exists between the first UE and the second UE.

13. The base station as recited in claim 12, wherein the computer-readable storage memory system includes processor-executable instructions that, responsive to execution by at least the one processor, cause the base station to detect the priority conflict exists by:
    detecting a quality of service (QoS) issue associated with the second UE; or
    detecting the second UE has a higher-priority grant request than the scheduled grant for the first UE.

14. The base station as recited in claim 11, wherein the computer-readable storage memory system includes processor-executable instructions that, responsive to execution by at least the one processor, cause the base station to perform further operations comprising:
   determining to revoke a partial grant of the scheduled grant, and
   reallocating the partial grant to the second UE.

15. The base station as recited in claim 14, wherein the computer-readable storage memory system includes processor-executable instructions that, responsive to execution by at least the one processor, cause the base station to determine to revoke the partial grant by:
   determining to revoke at least one of:
      a beam of the scheduled grant;
      a layer of the scheduled grant; or
      a subset of granted resource units or blocks of the scheduled grant.

16. The base station as recited in claim 15, wherein the computer-readable storage memory system includes processor-executable instructions that, responsive to execution by at least the one processor, cause the base station to perform further operations comprising:
   selecting, as the partial grant of the scheduled grant to revoke, a first beam of the scheduled grant that has a higher modulation and coding scheme (MCS) relative to a second MCS of a second beam of the scheduled grant.

17. The base station as recited in claim 15, wherein the computer-readable storage memory system includes processor-executable instructions that, responsive to execution by at least the one processor, cause the base station to determine to perform further operations comprising:
   selecting, as the partial grant of the scheduled grant to revoke, at least one of:
      a physical downlink shared channel (PDSCH) layer of multiple PDSCH layers in the scheduled grant; or
      a physical uplink shared channel (PUSCH) layer of multiple PUSCH layers in the scheduled grant.

18. The base station as recited in claim 11, wherein the computer-readable storage memory system includes processor-executable instructions that, responsive to execution by at least the one processor, cause the base station to perform further operations comprising:
   rescheduling the scheduled transmission that uses at least the portion of the scheduled grant.

19. The base station as recited in claim 18, wherein the computer-readable storage memory system includes processor-executable instructions that, responsive to execution by at least the one processor, cause the base station to reschedule the scheduled transmission by:
   rescheduling the scheduled transmission using:
      an automatic repeat request (ARQ); or
      a hybrid automatic repeat request (HARQ).

20. The base station as recited in claim 11, wherein the computer-readable storage memory system includes processor-executable instructions that, responsive to execution by at least the one processor, cause the base station to perform further operations comprising:
   providing at least the portion of the scheduled grant to be revoked using a first radio access technology, RAT; and
   transmitting the GRM using a second RAT.

* * * * *

UNITED STATES PATENT AND TRADEMARK OFFICE
CERTIFICATE OF CORRECTION

PATENT NO. : 11,963,181 B2
APPLICATION NO. : 17/294292
DATED : April 16, 2024
INVENTOR(S) : Jibing Wang and Erik Stauffer Page 1 of 1

It is certified that error appears in the above-identified patent and that said Letters Patent is hereby corrected as shown below:

In the Claims

Column 20, Line 26: After "request", delete "(HARD)" add --(HARQ)--

Signed and Sealed this
Twenty-fifth Day of June, 2024

Katherine Kelly Vidal
*Director of the United States Patent and Trademark Office*